US008364847B2

(12) United States Patent
Anipko et al.

(10) Patent No.: US 8,364,847 B2
(45) Date of Patent: Jan. 29, 2013

(54) ADDRESS MANAGEMENT IN A CONNECTIVITY PLATFORM

(75) Inventors: Dmitry Anipko, Bellevue, WA (US);
David G. Thaler, Redmond, WA (US);
Deepak Bansal, Redmond, WA (US);
Benjamin M. Schultz, Kirkland, WA (US); Rajesh Sundaram, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 643 days.

(21) Appl. No.: 12/050,027

(22) Filed: Mar. 17, 2008

(65) Prior Publication Data

US 2009/0222559 A1 Sep. 3, 2009

Related U.S. Application Data

(63) Continuation-in-part of application No. 12/040,330, filed on Feb. 29, 2008.

(51) Int. Cl.
*G06F 15/16* (2006.01)

(52) U.S. Cl. ........ 709/245; 709/221; 709/238; 370/401; 370/349; 714/33; 714/43

(58) Field of Classification Search ............... 709/225
See application file for complete search history.

(56) References Cited

U.S. PATENT DOCUMENTS

| | | | |
|---|---|---|---|
| 5,142,622 A | 8/1992 | Owens | |
| 5,931,900 A | 8/1999 | Notani et al. | |
| 6,101,543 A | 8/2000 | Alden et al. | |
| 6,493,765 B1 | 12/2002 | Cunningham et al. | |
| 6,496,511 B1 * | 12/2002 | Wang et al. | 370/401 |
| 6,771,635 B1 * | 8/2004 | Vilander et al. | 370/349 |
| 6,856,624 B2 | 2/2005 | Magret | |
| 6,934,763 B2 | 8/2005 | Kubota et al. | |
| 7,079,520 B2 | 7/2006 | Feige et al. | |
| 7,519,865 B1 * | 4/2009 | Maly et al. | 714/33 |
| 2003/0140283 A1 * | 7/2003 | Nishio | 714/43 |
| 2003/0158962 A1 * | 8/2003 | Keane et al. | 709/238 |
| 2004/0064584 A1 | 4/2004 | Mitchell et al. | |
| 2004/0139228 A1 | 7/2004 | Takeda et al. | |
| 2005/0105543 A1 | 5/2005 | Ikenaga et al. | |

(Continued)

FOREIGN PATENT DOCUMENTS

| | | |
|---|---|---|
| EP | 1659729 A1 | 5/2006 |
| WO | 2006087429 A1 | 8/2006 |

OTHER PUBLICATIONS

Oran, David "OSI IS-IS Intra-domain Routing Protocol", (Feb. 1990), pp. 1-152. http://www.vorlesungen.uos.de/informatik/ip00/rfc/1100/rfc1142.pdf.

(Continued)

*Primary Examiner* — Hua Fan
(74) *Attorney, Agent, or Firm* — Microsoft Corporation

(57) ABSTRACT

Disclosed are an approach form managing and assigning addresses in a connectivity platform that allows for proprietary connectivity modules (Providers) to plug into the operating system. In this disclosure, when a user/application/computing device, connects to another user on another computing device an address is generated for that user. However, because of a limited number of addresses that are available in an address space, it is necessary to ensure that a conflicting address is not present. To ensure this the connectivity platform determines if the address assigned is in conflict with another address associated with users that are located on the other computing devices. If an address is found to be in conflict the connectivity platform reassigns the address until a non-conflicting address is found. If a non-conflicting address cannot be found the connectivity platform blocks the connection between the user and the other user.

20 Claims, 12 Drawing Sheets

U.S. PATENT DOCUMENTS

| | | | |
|---|---|---|---|
| 2005/0165953 | A1 | 7/2005 | Oba et al. |
| 2005/0185647 | A1 | 8/2005 | Rao et al. |
| 2005/0271047 | A1 | 12/2005 | Huonder et al. |
| 2006/0182100 | A1 | 8/2006 | Li et al. |
| 2006/0209716 | A1 | 9/2006 | Previdi et al. |
| 2006/0215684 | A1 | 9/2006 | Capone |
| 2006/0262786 | A1 | 11/2006 | Shimizu et al. |
| 2007/0058568 | A1 | 3/2007 | Previdi et al. |
| 2007/0091907 | A1 | 4/2007 | Seshadri et al. |
| 2007/0239860 | A1* | 10/2007 | Shirai .................... 709/221 |
| 2008/0080508 | A1 | 4/2008 | Das et al. |

OTHER PUBLICATIONS

Helmy, Ahmed et al., "Efficient Micro-Mobility using Intra-domain Multicast-based Mechanisms (M&M)", pp. 1-12. http://www.citebase.org/fulltext?format=application/pdf&identifier=oai:arXiv.org:cs/0208025.

Huston, Geoff "Scaling Inter-Domain Routing—A View Forward", Dec. 2001, pp. 1-15. http://www.potaroo.net/papers/ipj/2001-v4-n4-scaling-bgp/scaling.pdf.

Estrin, Deborah et al., "Scalable Inter-Domain Routing Architecture", pp. 1-21. http://citeseer.ist.psu.edu/cache/papers/cs/2677/ftp:zSzzSzftp.ccs.neu.eduzSzpubzSzpeoplezSzmattazSzScal-routingzSzidr-sigcomm.final.pdf/estrin92scalable.pdf.

"Routing to External Domains", (Jan. 24, 2008), 5 Pages. http://technet.microsoft.com/en-us/library/bb232045.aspx.

"Secure Remote Access from Office to Home", Afsushi Kara, University of Aizu, IEEE Communications Magazine, Oct. 2001, pp. 68-72.

"A GateKeeper-based NAT traversal method for media transport in H.323 network system", Xuesong Cao, Ruimin Hu, Xuergong Bian and Yuhong Yang, IEEE 2005, pp. 1288-1291.

"Tunneling IPv6 through NAT with Teredo Mechanism", Shiang-Ming Huang, Quincy Wu and Yi-Bing Lin, IEEE, Proceedings of the 19th International conference on Advanced Information Networking and Applications (AINA '05), 2005, 6 pgs.

"Smart Tunnel Union for NAT Traversal", Digital Library, Tzu-Chi Huang, Ce-Kuen Shieh, Wen-Huang Lai and Yu-Ben Miao, Fourth IEEE International Symposium on Network Computing and Applications, 2005, Abstract Only.

"NAT Traversal Techniques and Peer-to-Peer Applications", Zho Hu, Telecommunications Software and Multimedia Laboratory, Helsinki University of Technology, HUT T-110.551 Seminar on Internetworking, Apr. 26/27, 2005, 5 pgs.

"NAT Traversal for VoIP and Internet communications using STUN, TURN and ICE", eyeball AnyFirewall Technology White Paper, Eyeball Networks Inc., 2007, 16 pgs.

"Winsock 2, Windows Socket: Story Part 2", Tenouk.com, May 13, 2007, retrieved from the Internet at: http://web.archive.org/web/20070513203452/http://www.tenouk.com/Winsock/Winsock2story.html, 9 pgs.

"Dynamic Configuration of IPv4 Link-Local Addresses", S. Cheshire, B. Aboba and E. Guttman, May 2005, retrieved from the Internet at: http://www.faqs.org/rfcs/rfc3927.html, 34 pgs.

Non-Final Office Action cited in related U.S. Appl. No. 12/040,330 dated Dec. 9, 2009.

Final Office Action cited in related U.S. Appl. No. 12/040,330 dated Apr. 15, 2010.

\* cited by examiner

ADDRESS MANAGEMENT IN A CONNECTIVITY PLATFORM

CROSS-REFERENCE TO RELATED APPLICATION

This application is a continuation-in-part of and claims priority from application Ser. No. 12/040,330 filed Feb. 29, 2008 entitled CONNECTIVITY PLATFORM.

TECHNICAL FIELD

This description relates generally to network connectivity and more specifically to the management of addresses in a connectivity platform.

BACKGROUND

Communications devices have multiple obstacles to the seamless exchange of data. Whether these devices are on Intranets or on the public Internet, various security and addressing devices could disrupt their communication. One device that can disrupt communication is a firewall. While the benefits of a firewall provide a higher security level, arbitrary ports are blocked which increases the possibility of communications interference. Another device that can disrupt the exchange of data is a Network Address Translator (NAT). NATs have the benefit of allowing multiple devices to share the same global IP address, by handing out private addresses behind these devices and masking these private addresses with that shared global address. In this process several assumptions are made that could disrupt data exchange. This can include overlap in private addressing. When applications run on communications devices that make addressing assumptions, the data exchange may not occur as expected, resulting in a poor usability experience.

Network Address Translator (NAT) devices allow multiple users to share the same global IP address. To accomplish this, NATs change addressing information in the packet header. However, NATs can damage end-to-end connectivity because as mentioned above the same private address may be used by multiple physical machines. Thus without some out of band mechanism it is impossible for the application to identify to which computing device the application is attempting to send the traffic. There are many NAT traversal solutions currently available. These solutions typically require that applications implement a customized NAT traversal. Examples of custom NAT traversal approaches include Simple Traversal of UDP through NATs (STUN) and Traversal using Relay NAT (TURN).

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides an approach for managing and assigning addresses in a connectivity platform that allows for proprietary connectivity modules (Providers) to plug into the operating system. In this example, when a user/application/computing device, connects to another user on another computing device an address is generated for that user. However, because of a limited number of addresses that are available in an address space, it is necessary to ensure that a conflicting address is not present. To ensure this the connectivity platform determines if the address assigned is in conflict with another address associated with users that are located on the other computing devices. If an address is found to be in conflict the connectivity platform reassigns the address until a non-conflicting address is found. If a non-conflicting address cannot be found the connectivity platform blocks the connection between the user and the other user. In other examples, the connectivity platform also ensures that multiple users on the connectivity platform do not share a conflicting address.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
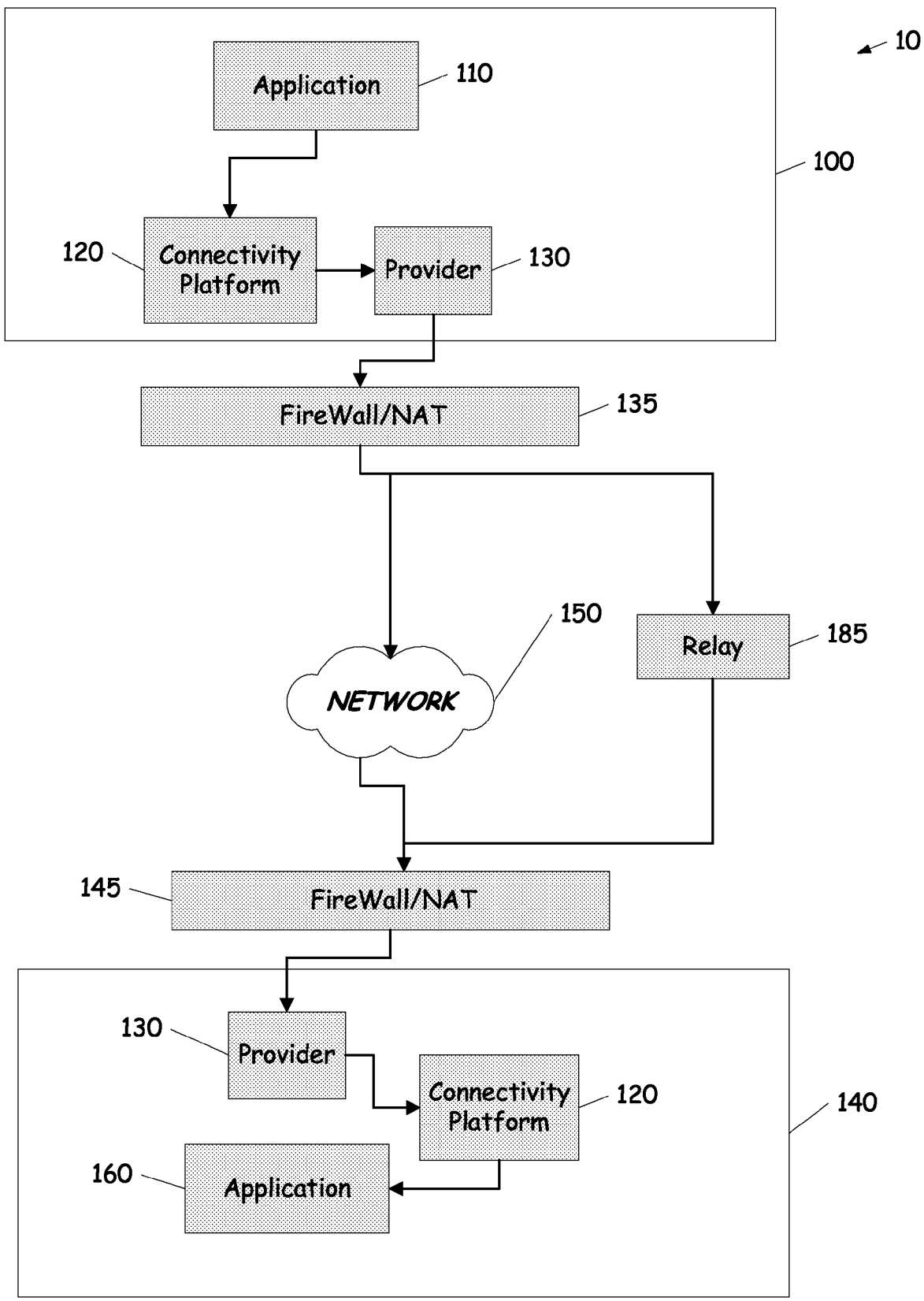
FIG. 1 is a block diagram of an illustrative connectivity system.

FIG. 1 is a block diagram of a connectivity system 10 according to one illustrative embodiment. System 10 includes computing device 100 and computing device 140. Computing device 100 includes an application 110, a connectivity platform 120 and a provider 130. Provider 130 communicates to another provider located on computing device 140 through a network, such as network 150. While the arrows in FIG. 1 indicate communication from computing device 100 to computing device 140, it should be noted that communication may flow in the opposite direction. In one embodiment, computing device 140 includes similar components as computing device 100. FIG. 1 illustrates an embodiment where a single application or user uses a provider 130 to connect to computing device 140. In this embodiment computing device 100 and computing device 140 have the same provider 130. However, in other embodiments each computing device 100, 140 may have a different provider. Prior to reaching the network 150 the provider processes a request through a firewall or Network Address Translator (NAT) 135. In one embodiment, from the NAT 135 a signal is transmitted through network 150 to a firewall or NAT 145 which protects computing device 140 and then onto components of computing device 140. While a firewall or NAT is illustrated at both computing device 100 and 140 in alternative embodiments one or both of the computing devices may lack a firewall or NAT.

Application 110 is any application running on, or service of, computing device 100 that requires a connection or communication with a computing device, such as to computing device 140 across a network. For example application 110 may be an internet/web browser, an instant messaging system, or any other application using a network. The application generates data that is to be communicated to the other computing device 140. The application 110 may also provide an identifier to the operating system of the computing device for the desired communication. In some embodiments data from application 110 can include an identifier or address of the destination computing device 140. In some embodiments application 110 may be located on a third computing device (not illustrated) that is connected to computing device 100 through a network.

Connectivity platform 120 is a component or components that enable a provider, such as provider 130, to plug into an operating system and/or an application running on the operating system to enable end-to-end connectivity. Connectivity platform 120 provides users (applications or services) of computing devices 100 and 140 with the ability to communicate with each other, or to other computing devices (not illustrated) connected through the network 150. To achieve this connectivity platform 120 that, in one embodiment, exposes a subnet network and routes data from application 110 to the provider (130). In one embodiment, the connectivity at the link and network layer is not transitive. In embodiments where multiple applications or users share a common provider 130 the connectivity platform or the provider 130 may limit the ability of those users or applications to connect with each other. The connectivity platform 120 will be discussed in greater detail with respect to FIG. 2 below.

Provider 130 is a component or module of system 10 that is configured to plug into the connectivity platform 120 in order to enable end-to-end connectivity between computing devices and users of the computing devices. In one embodiment the provider 130 provides some form of NAT or firewall traversal, and may also provide a direct a data relay (illustrated as relay 185) when NAT or firewall traversal fails. Other implementations of a (relay 185-provider 130) combination may include alternative transport mechanisms including for example low priority file transfers. In some embodiments provider 130 may encapsulate packets that are sent by the connectivity platform 120 into packets that are routable over the network 150. In some embodiments multiple peers (i.e., computing devices that are all using the same or compatible providers) could build an overlay mesh network over which they could route communications as an alternative to a relay or direct communication. Provider 130 may register with the connectivity provider 120 multiple times to provide services to the same or multiple users on the computing device 100. For purposes of this discussion each registration by the provider 130 will be referred to as a provider instance. Further, for purposes of simplicity only one provider instance will be discussed. However, it is possible that multiple provider instances may be used simultaneously, for example when the user has multiple identities that need connectivity and are understood by the provider 130. The provider instance is generated inside the connectivity platform 120.

In general provider 130 can be any type of provider available. One requirement of the provider 130 is that it provides end to end network connectivity. The provider 130 transfers arbitrary data from application 110 to application 160 through the connectivity platforms based on addresses that have been associated with the applications 110, 160, users and/or computing devices through designated provider instances. The provider 130 also allows for detecting whether an address is reachable through the designated provider instance. In one embodiment the addresses involved could use IPv4 or IPv6 protocols.

Network 150 is a network that may provide connectivity for computing devices 100 and 140 Network 150 may be, for example, the Internet, a local area network, a wide area network, an intranet or any other system that allows or facilitates communication between the computing devices 100 and 140.

Firewall 135 is a component that regulates the flow of traffic between computer networks or between computing devices such as computing devices 100 and 140 based on a set of rules. Firewall 135 may also include network address translation (NAT) functionality. However, in some embodiments the firewall 135 is simply a NAT. In some embodiments, computing devices 100 and 140 are located behind a firewall have addresses in the "private address range", for example as defined in RFC 1918. The NAT functionality of firewall 135 functions to address the limited number of IPv4 routable addresses that can be used. Again as mentioned above, in other embodiments Firewall or NAT devices may only be present at some locations, or not be present at all.

Figure 2:
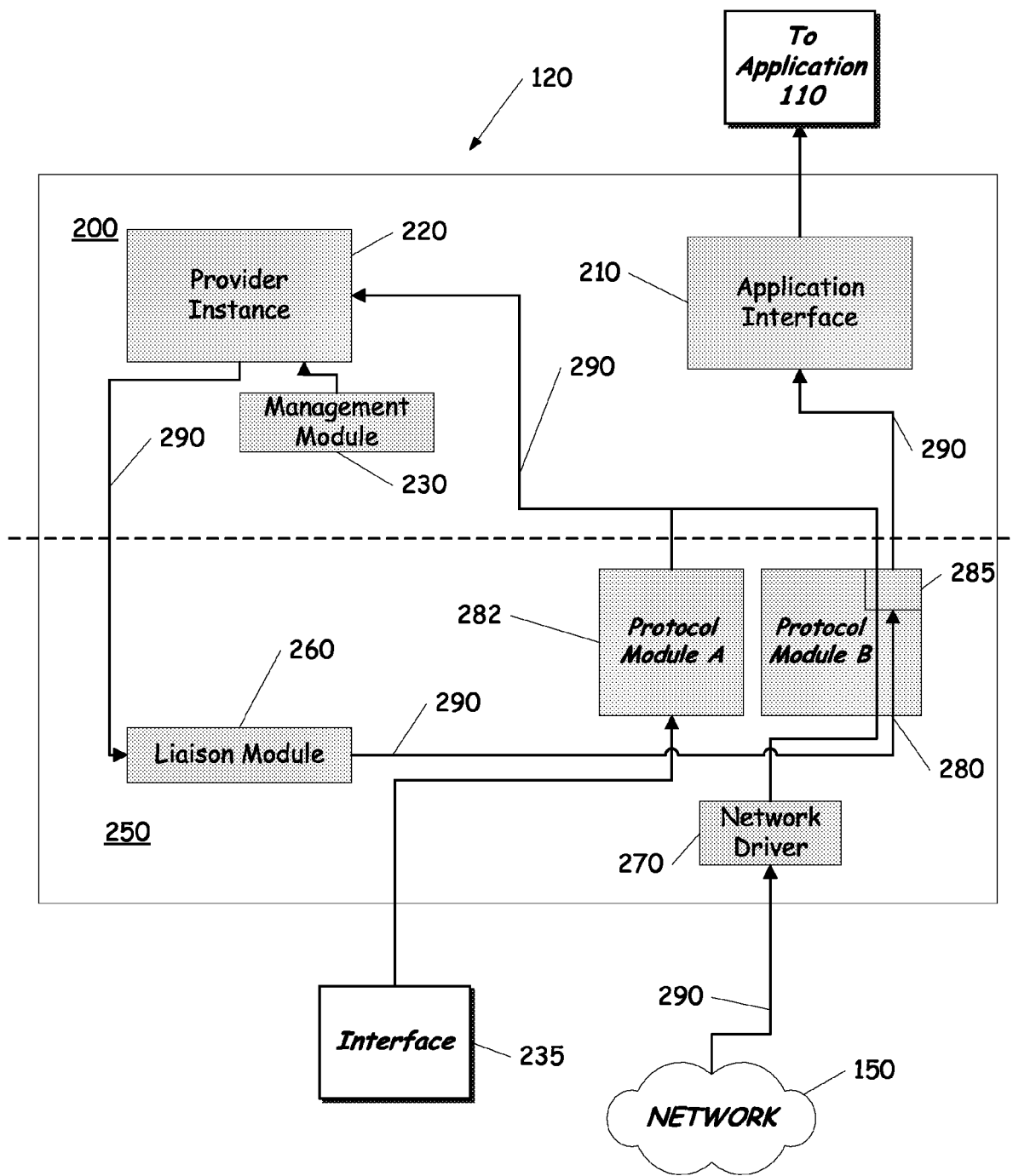
FIG. 2 is a block diagram illustrating components of a connectivity platform according to one embodiment.

FIG. 2 illustrates the components and data flow through the connectivity platform 120 according to one illustrative embodiment. While the components illustrated in FIG. 2 are shown as being in close proximity to each other, in some embodiments the components of the connectivity platform 120 are located throughout the system 10.

Connectivity platform 120 is divided into a user mode 200 and a kernel mode 250. The user mode 200 of connectivity platform 110 has an application interface 210 (which interfaces with application 110 of FIG. 1), a provider instance 220 and a management module 230. The kernel mode 250 of connectivity platform 120 has an liaison module 260, a network driver 270 and a protocol module 280. While the present discussion is directed to a portion of the connectivity platform 120 being in a user mode and a portion in kernel mode, in other embodiments the connectivity platform 120 may be entirely in the user mode, or alternatively entirely in the kernel mode.

Provider instance 220 is an instance created by a provider, such as provider 130 (FIG. 1), as a result of a user action or other event. In one illustrative embodiment the provider instance 220 includes two interfaces for communicating with the provider 130. In one embodiment the interface is an LRPC interface. However, other types of interfaces may be used. The first interface is used by the provider 130 to register/deregister with the connectivity platform 120. The second interface is used by the liaison module 260 to call the provider 130 for control and data exchange.

Management module 230 is a module configured to support the transition between different addressing protocols. Additionally the management module 230 is configured to implement the registration and deregistration of providers 130 and provider instances 220, configure the IP addresses according to the correct protocols, and implement any required filters. Further, the management module 230 is configured to place the provider instances 220 into or out of a dormant state. It should be noted that the management module 230 is not part of the flow of data through the connectivity platform 120.

Liaison module 260 is a component of connectivity platform 120 that takes data to be transmitted and facilitates transmission over the provider instance 220. In one embodiment liaison module 260 is the tunnel.sys of the Windows operating system. In another embodiment the liaison module 260 is the "tun" driver of the Unix operating system. However other types of liaison modules may be used. Network driver 270 is a software module configured to enable different network protocols communicate with a variety of network adaptors. In one embodiment the network driver 270 is compliant with network driver interface specification (NDIS). In general, network driver 270 represents a virtual or physical media (Ethernet, for example) in an interface that is understood by NDIS clients such as TCP/IP stack.

Protocol module 280 is a component that maintains a set of protocols that work together on different levels to enable communication through network 150. In one embodiment protocol module 280 implements TCP/IP protocols. Additionally, in some embodiments, protocol module 280 includes a filtering platform 285. Filtering platform 285 provides a platform for creating network filtering applications and/or inspection applications. In one embodiment the filtering platform 285 is the Windows Filtering Platform (WFP). However, other filtering methods can be used.

Interface 235 is a secondary interface through which data may flow. Interface 235 provides a platform for connecting to applications through connectivity platform 120 without using network 150. Interface 235 may be a Bluetooth connection, an IR connection, or any other connection platform that does not require the data to be received over network 150. Interface 235 interacts with the connectivity platform 120 through protocol module 282. In some embodiments, protocol module 282 may be the same as protocol module 280.

Briefly the flow of data through the connectivity platform 120 will be discussed. The arrows 290 illustrated in FIG. 2 indicate the direction of the flow of data through the connectivity platform 120 in one direction. A more detailed description of the process will be provided with respect to FIGS. 3 and 4. In some embodiments, for inbound data, data traffic is received by the protocol module 280 and passed to the provider instance 220. In other embodiments, inbound data is received by interface 235 and passed to the provider instance 220. In some embodiments, at this point the provider instance 220 may decapsulate or packet process the data. The data traffic is then passed through liaison module 260, and is re-processed by the protocol module 280. If authorized by the filtering platform 285 according to the policy of the provider 130, provider instance 220 traffic is delivered to the application 110. In some embodiments, filtering platform 285 employs its own filtering rules as well. Outbound traffic flows in the opposite direction of arrows 290 as illustrated in FIG. 2.

Figure 3:
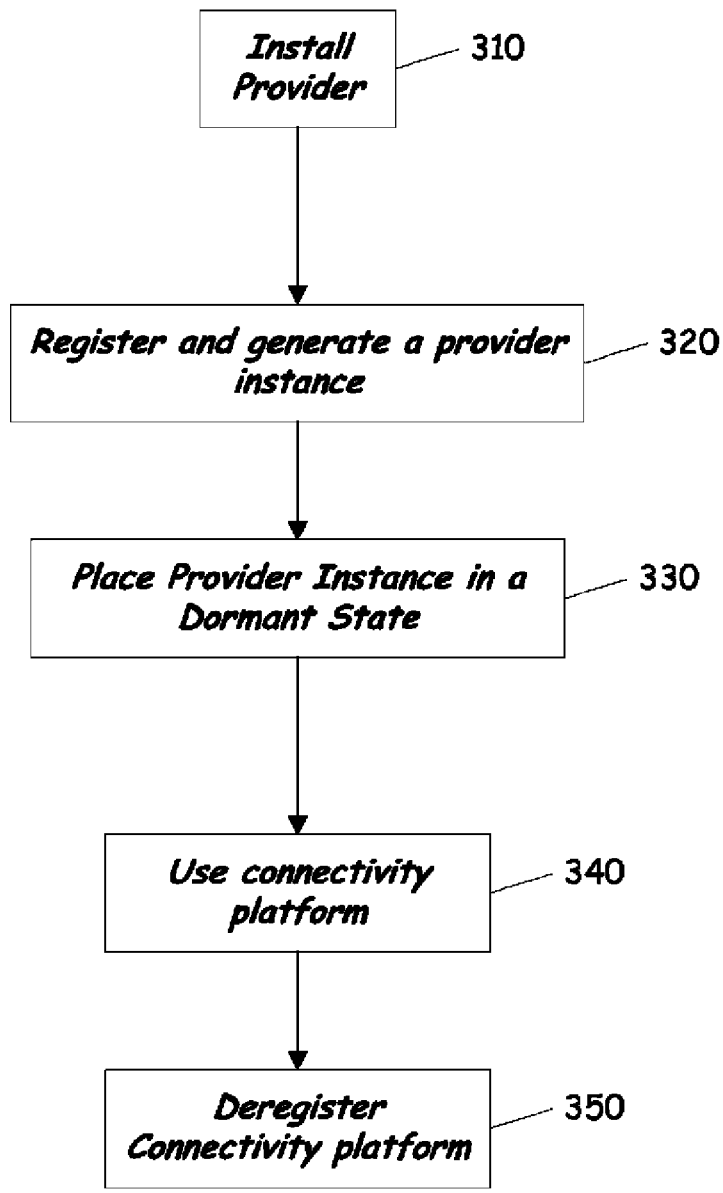
FIG. 3 is a flow diagram illustrating a process associated with the connectivity platform according to one embodiment.

FIG. 3 is a flow diagram illustrating a process for installing, registering and using a provider instance 220 according to one illustrative embodiment. For purposes of simplicity the discussion of FIG. 3 assumes that only one instance is being installed. However, a similar process may be used when multiple providers and provider instances are present.

At step 310 a provider, such as provider 130, is installed on computing device 100. Providers 130 are typically installed as a result of a user action. However, in some embodiments the provider 130 may be native to the operating system or provided as part of a larger package of software or hardware that is on the computing device. The installation of the provider 130 is executed according to the process defined by the provider.

At step 320 the provider generates the provider instance 220 which then registers with the connectivity platform 120. If this is the first time that the provider instance 220 has registered with the connectivity platform 120 the connectivity platform 120 creates a new IP interface and associates this IP interface with the provider instance 220. If the provider instance 220 has previously registered with the connectivity platform 120 then the connectivity platform 120 may reuse the IP interface that was previously associated with the provider instance 220.

During the first registration of the provider instance 220 the connectivity platform 120 may execute additional processes. For example, the connectivity platform 120 may create a user friendly name for the assigned IP interface. This user friendly name can assist a user in identifying the interface during a diagnostic procedure or other procedure where finding the interface may be useful. In some embodiments this name, or other identifier such as an IP address, may be made available to a remote user or application, such as a buddy or a friend, for end to end communication. The connectivity platform 120 may also configure filters on the system, such as filtering platform 285 to implement any access controls that the provider 130 requires. The provider 130 provides this information to the connectivity platform during the registration process.

Also during the registration of the provider instance 220 the connectivity platform configures routing for data. This on-link routing, according to one embodiment, is for IPv4 and IPv6 subnets, where the prefixes needed are specified by the provider 130. However, in some embodiments a default prefix is generated by the connectivity platform. The on-link routes assist the protocol module to look-up and consider the assigned IP interface as a candidate interface during data communication between the computing device 100 and the remote computing device 140.

At step 330 the connectivity platform 330 sets the provider instance 220 to a dormant state. However, in some embodiments the provider instance is assumed to be dormant. By a dormant state it is meant that the provider instance 220 is not active and is not sending or receiving data through the connectivity provider 120. However, this does not necessarily mean that the provider instance 220 is actually dormant.

At step 340 the connectivity platform 120 is used in communicating between the two applications through the network. The process performed by the connectivity platform 120 at this step is described in greater detail in FIG. 4.

Figure 4:
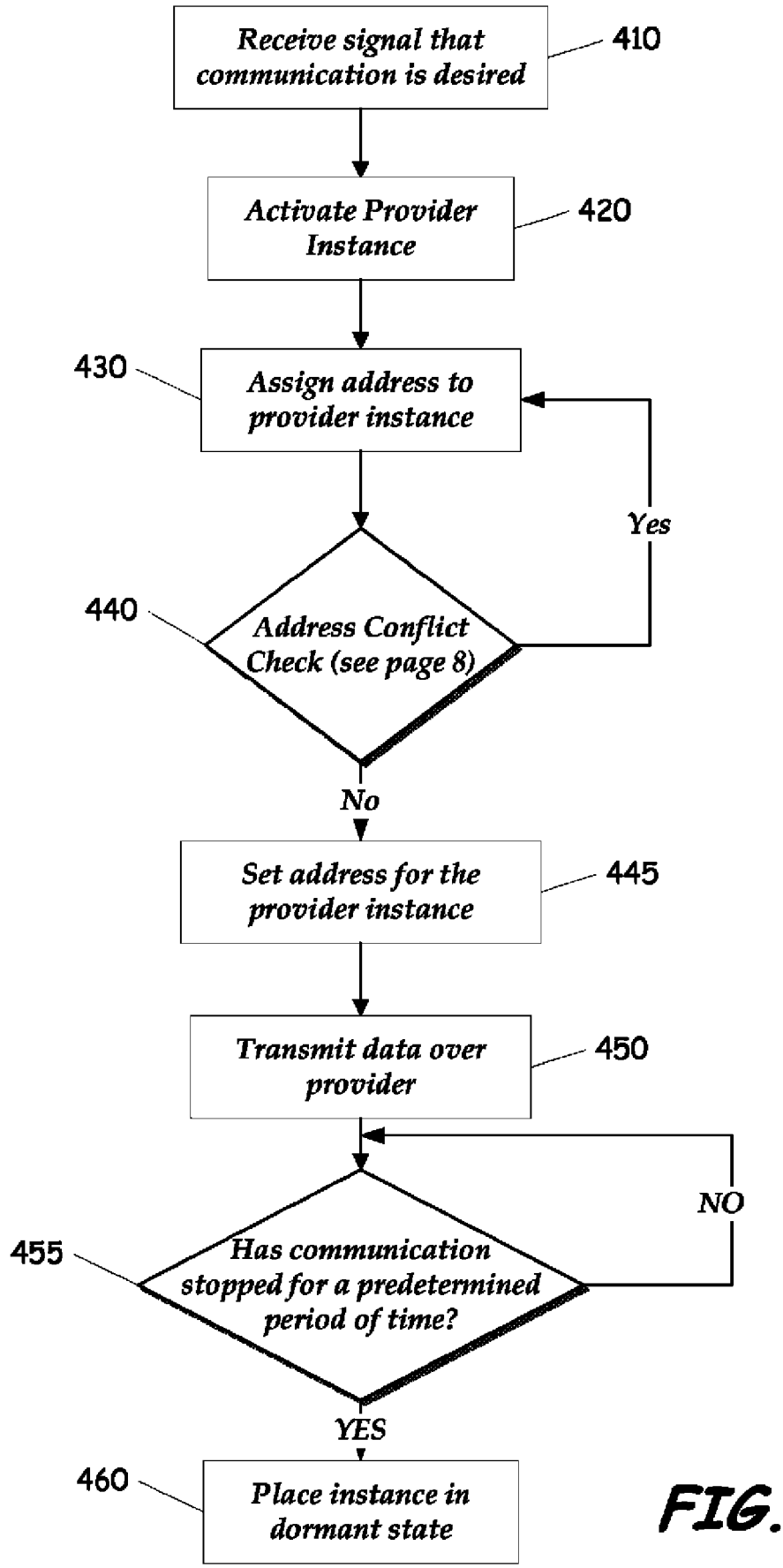
FIG. 4 is a flow diagram illustrating a process for using the connectivity platform according to one embodiment.

FIG. 4 is a flow diagram illustrating a process used by the connectivity platform 120 to process communications according to one illustrative embodiment. At step 410 the connectivity platform 120 receives a signal (either from application 110 or from a remote computing device) indicating that communications are desired. In one embodiment this signal can be generated by the opening of a listening endpoint by application 110 that is allowed by the firewall or other policy implementing mechanism to receive edge traversal traffic. In another embodiment the signal is generated by the application 110 for sending outgoing traffic over an interface associated with a provider interface. In yet another embodiment the signal may be a call to a function that brings edge traversal interfaces to a qualified or active state.

Following receipt of the signal the connectivity platform 120 may need to change the state of the provider instance from dormant to active, if the provider instance was not active at the time the signal was received. This is illustrated at step 420. In activating the provider instance the liaison module 260 makes a call to the provider instance 220. This call to the provider instance 220 activates the instance and data can be sent. As discussed above in one embodiment this call can be a RPC call.

Once the provider instance 220 is active the connectivity platform 120 then proceeds to generate an address for the provider instance. This is illustrated at step 430. In one embodiment the address is automatically configured. In one embodiment this random address is generated using the management module 280 to generate a random address. In other embodiments the address is obtained from other sources.

Once the address has been generated, the connectivity platform 120 requests that the provider 130 perform address conflict detection. The conflicting addresses may be identified by reviewing the addresses associated with the provider 130 across all of the computing devices that reachable through network 150. This is illustrated at step 440. The address conflict detection is requested to ensure that when the data is transmitted to the desired application or user that it is sent to the correct application or user. If two users or applications have provider instances that have the same address then it is not possible to route the data to the correct location. If the provider determines that there is no conflicting address assigned, a signal is provided to the connectivity platform 120 to assign the selected address to the interface associated with the provider instance 220. This is illustrated at step 445.

If the provider 130 determines that the selected address is in conflict with another address, the provider sends a signal to the connectivity platform indicating that the address is in conflict. This signal causes the connectivity platform 120 to return to step 430 and repeat this process until an address is generated that does not conflict with another address. In some embodiments, a component or system could track all addresses and centrally manage the addresses to avoid conflicts. A more detailed description of one process for managing conflicting addresses is discussed in greater detail with respect to FIGS. 8-12 below.

Once the address is assigned to the provider instance 220 the data is transmitted to and from the application 110. This is illustrated at step 450. In some embodiments this communication could be simplex. The data is transmitted according to the procedures associated with the provider 130. The provider 130 performs the actual traversal of the NAT 135. During this data transfer the data may be encapsulated both by the liaison module 260 and by the provider instance 220.

Following the completion of the data transmission between the applications 110 and 160 the connectivity platform 120 proceeds to wait a predetermined period of time. This is illustrated at step 455. In one embodiment if the there has been no additional data transfers either inbound or outbound over that period of time, the connectivity platform places the provider instance 220 in to a dormant state. This is illustrated at step 460. If data continues to transfer, the connectivity platform 120 keeps the provider instance 220 open until such time as it has been inactive for the predetermined period of time. In another embodiment the provider instance may remain active if a component that is awaiting a message from another provider is still open the provider instance 220 will remain active, even though data is not being transferred.

Referring back to FIG. 3 at step 350 a provider may deregister from the connectivity platform 120. When a provider 130 deregisters from the connectivity platform the connectivity platform 120 removes any addresses and routes that were configured during the registration process. Further, the provider interface 220 can be removed if for example the provider 130 requests this removal during the deregistration process.

Figure 5:
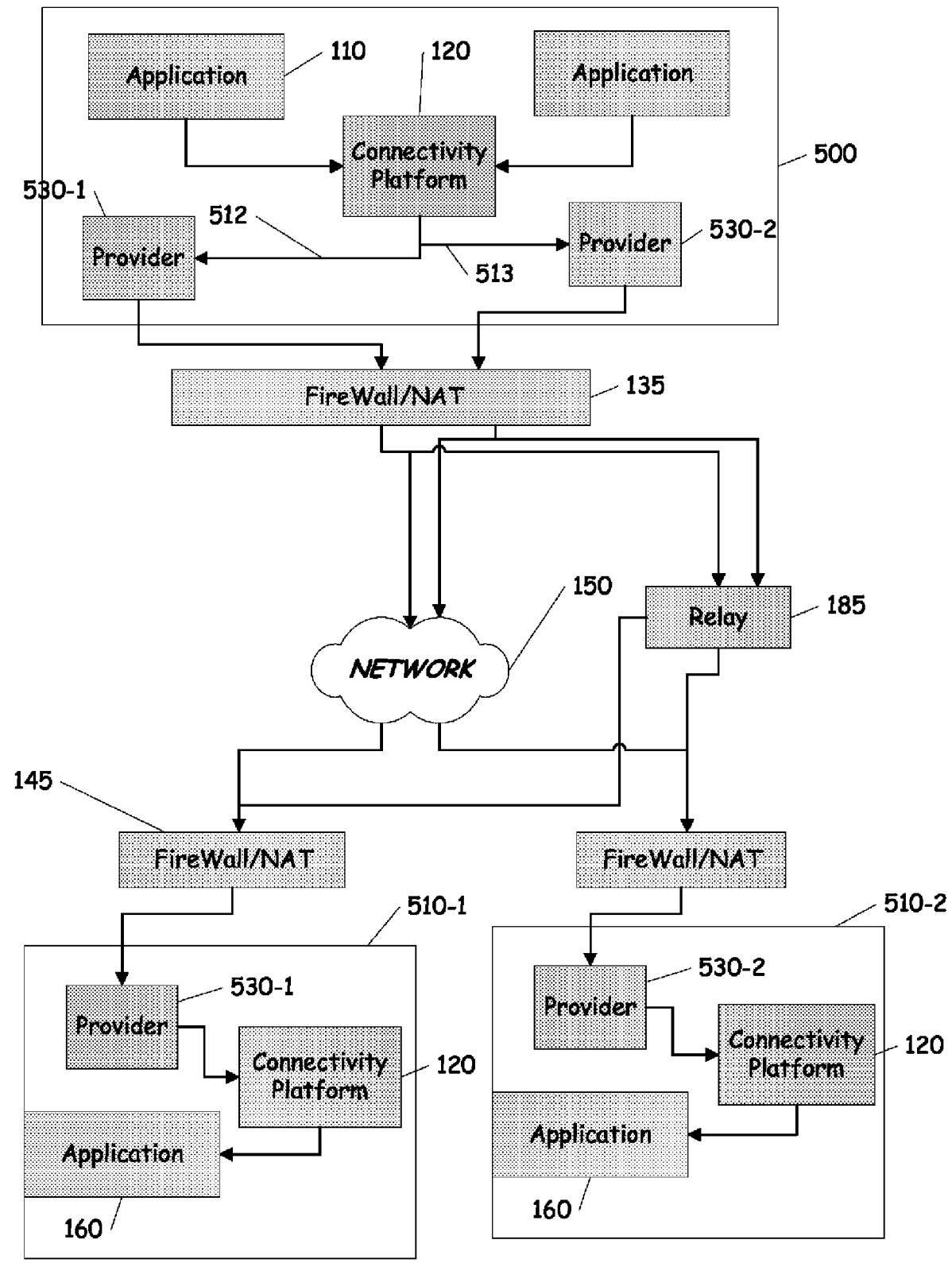
FIG. 5 is a block diagram of the connectivity system according to an alternative embodiment.
Figure 6:
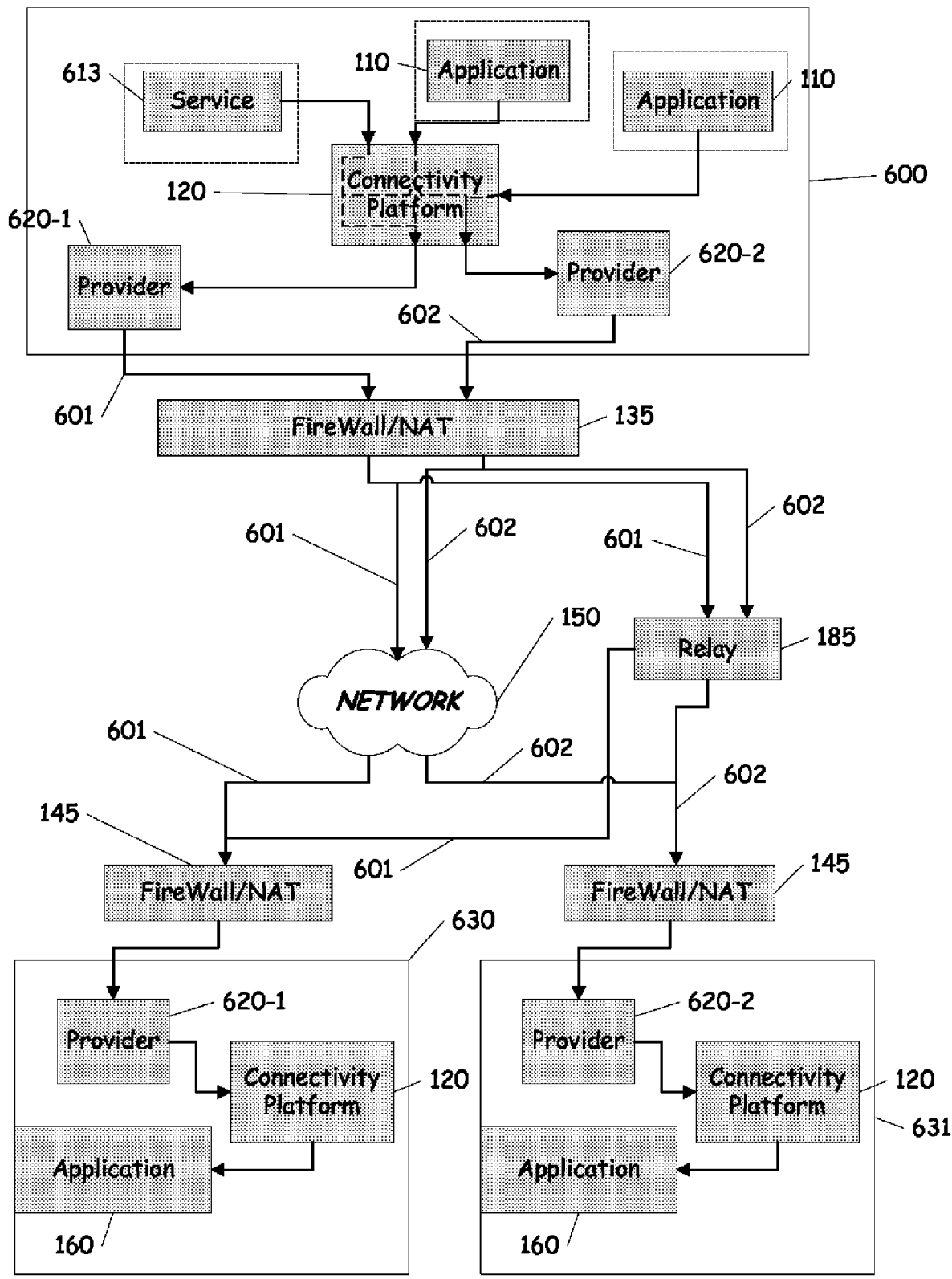
FIG. 6 is a block diagram of the connectivity system according to another alternative embodiment.

While the above discussion has focused on examples where the connectivity platform 120 interacts with a single provider 130, FIGS. 5 and 6 illustrate exemplary alternative embodiments for implementing the connectivity platform 120. Reference numbers that are repeated refer to the same or similar components.

FIG. 5 is a block diagram illustrating a single user of a computing device 500 using multiple providers 530-1, 530-2 to connect to computing devices 510-1, 510-2 that have instances of the same provider 530-1, 530-2 installed. As illustrated in FIG. 5 there are two virtual links 512 and 513. Each link 512, 513 is associated with one of the providers 530-1, 530-2. Computing device 500 is multi-homed to both links. On computing device 500, the connectivity platform 120 assigns different addresses to the interfaces corresponding to the provider instances of providers 530-1, 530-2. To connect to either computing device 510-1 or computing device 510-2, the provider instance selection is performed using each provider instance's ability to detect whether a remote address is reachable via that provider instance as discussed above. Once the correct provider 530-1, 530-2 is selected the use of the instance is the same as discussed above with respect to FIGS. 3 and 4.

FIG. 6 is a block diagram illustrating a multiple user and multiple computing device setup according to one illustrative embodiment. As illustrated in FIG. 6 computing device 600 has two users, 610 and 611 respectively. In one embodiment, each user 610, 611 uses a different provider instance, provider instances 620-1 and 620-2 to communicate with applications 160 on computing devices 630 and 631 respectively. Additionally, the local system 612 of computing device 600 can access the connectivity provider 120 to provide service 613. In the embodiment service 613 has access to both providers 620-1 and 620-2. In FIG. 6 there are two virtual links 601 and 602 (one per provider instance), and computing device 600 is multi-homed to both links.

The provider instances 620-1, 620-2 determine the access policy controlling the user's 610, 611 access to the provider instances as has been discussed above. For example, the policy may allow the system service 613 implementing the resource sharing functionality to access the provider instances so that: the user of computing device 630 can connect to resources shared by user 610 on computing device 600, and the user of computing device 631 can connect to resources shared by user 611 on computing device 600. Once the connection is established the system of FIG. 6 operates similar to the systems discussed above.

Figure 7:
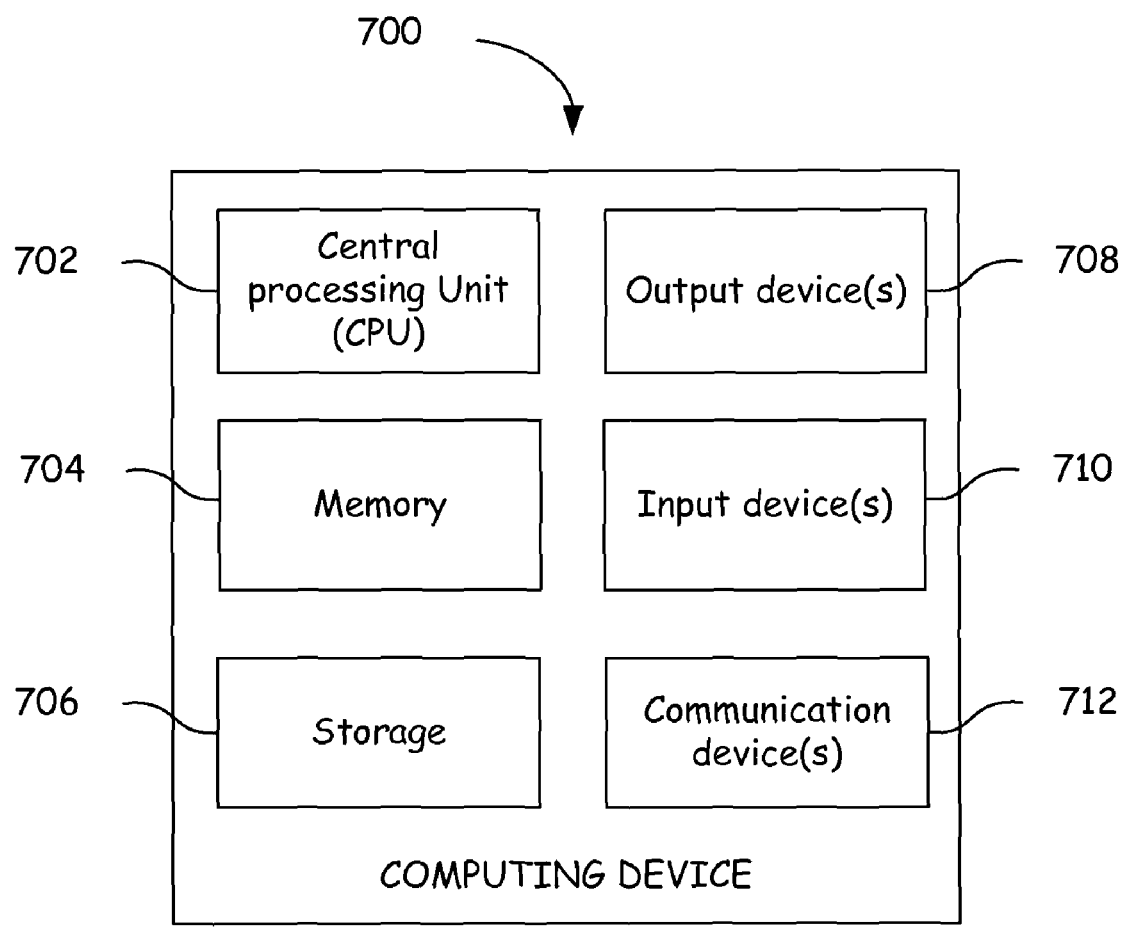
FIG. 7 is a block diagram illustrating components of a computing device according to one embodiment.

FIG. 7 illustrates a component diagram of a computing device according to one embodiment. Computing device 700 is similar to computing devices discussed above with respect to FIGS. 1-6. The computing device 700 can be utilized to implement one or more computing devices, computer processes, or software modules described herein. In one example, the computing device 700 can be utilized to process calculations, execute instructions, receive and transmit digital signals. In another example, the computing device 700 can be utilized to process calculations, execute instructions, receive and transmit digital signals, receive and transmit search queries, and hypertext, compile computer code, as required by the application 110 or application 160.

The computing device 700 can be any general or special purpose computer now known or to become known capable of performing the steps and/or performing the functions described herein, either in software, hardware, firmware, or a combination thereof.

In its most basic configuration, computing device 700 typically includes at least one central processing unit (CPU) 702 and memory 704. Depending on the exact configuration and type of computing device, memory 704 may be volatile (such as RAM), non-volatile (such as ROM, flash memory, etc.) or some combination of the two. Additionally, computing device 700 may also have additional features/functionality. For example, computing device 700 may include multiple CPU's. The described methods may be executed in any manner by any processing unit in computing device 700. For example, the described process may be executed by both multiple CPU's in parallel.

Computing device 700 may also include additional storage (removable and/or non-removable) including, but not limited to, magnetic or optical disks or tape. Such additional storage is illustrated in FIG. 7 by storage 706. Computer storage media includes volatile and nonvolatile, removable and non-removable media implemented in any method or technology for storage of information such as computer readable instructions, data structures, program modules or other data. Memory 704 and storage 706 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 700. Any such computer storage media may be part of computing device 700.

Computing device 700 may also contain communications device(s) 712 that allow the device to communicate with other devices. Communications device(s) 712 is an example of communication media. Communication media typically embodies computer readable instructions, data structures, or program modules. The term computer-readable media as used herein includes both computer storage media and communication media. The described methods may be encoded in any computer-readable media in any form, such as data, computer-executable instructions, and the like.

Computing device 700 may also have input device(s) 77 such as keyboard, mouse, pen, voice input device, touch input device, etc. Output device(s) 708 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Figure 8:
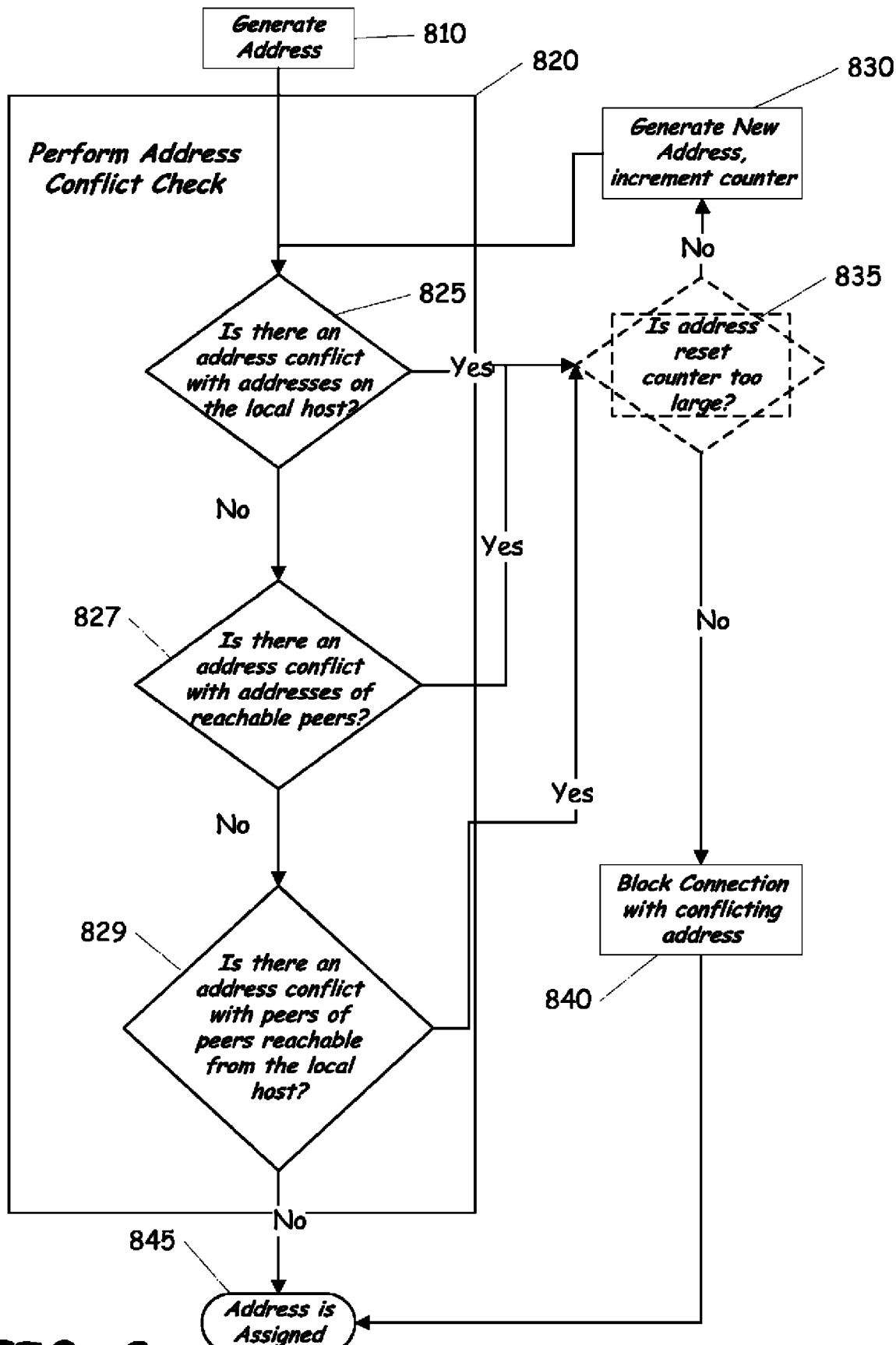
FIG. 8 is flow diagram illustrating a process for assigning, managing and detecting address according to one embodiment.
Figure 9:
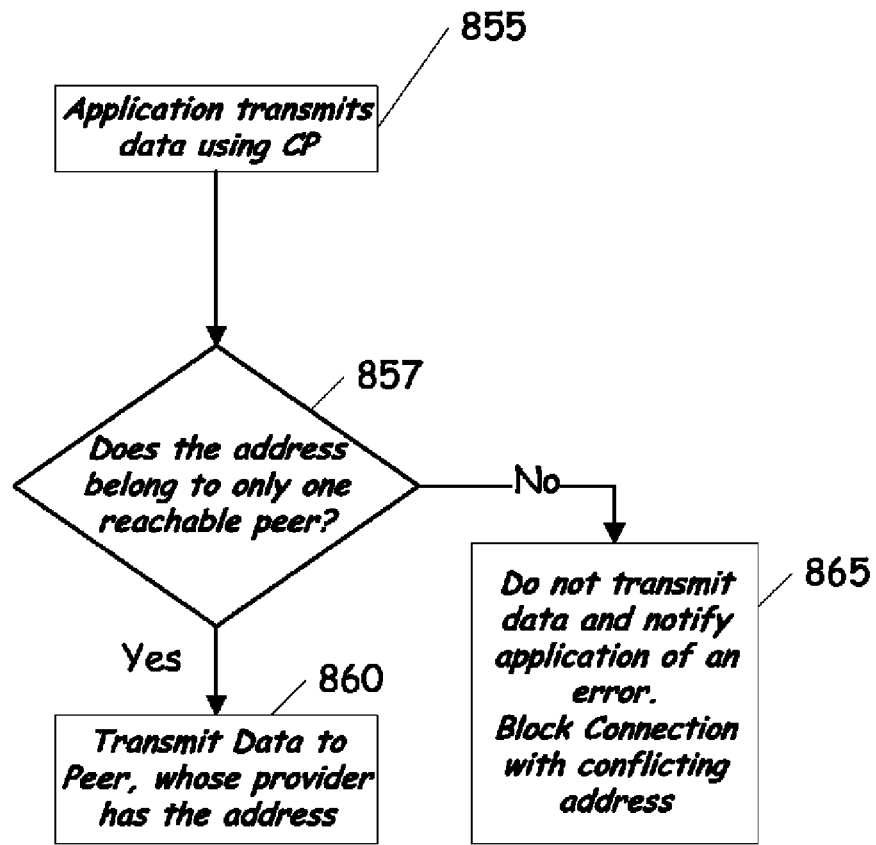
FIG. 9 is a flow diagram illustrating a process for detecting and managing address conflicts when a data transmission is desired according to one embodiment.
Figure 10:
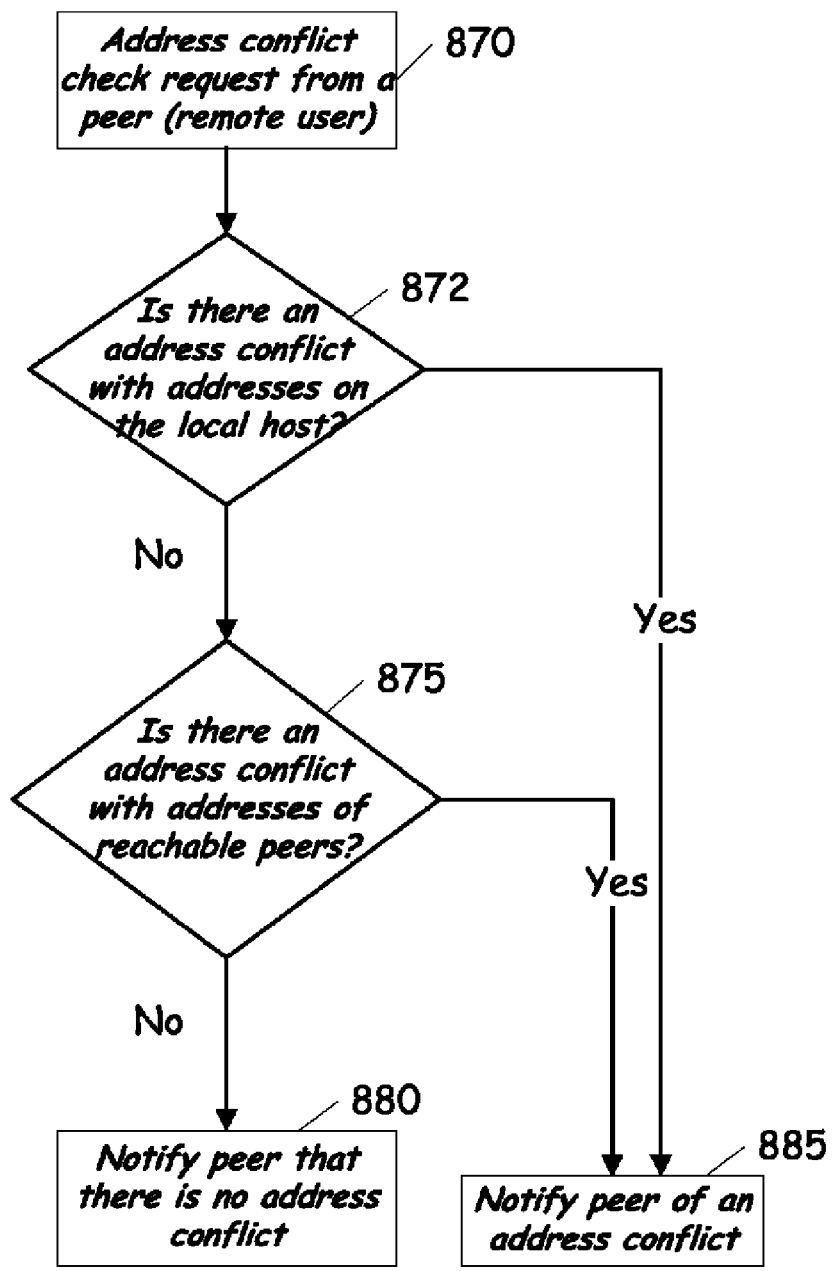
FIG. 10 is a flow diagram illustrating a process for managing a request for an address conflict check by a peer according to one embodiment.
Figure 11:
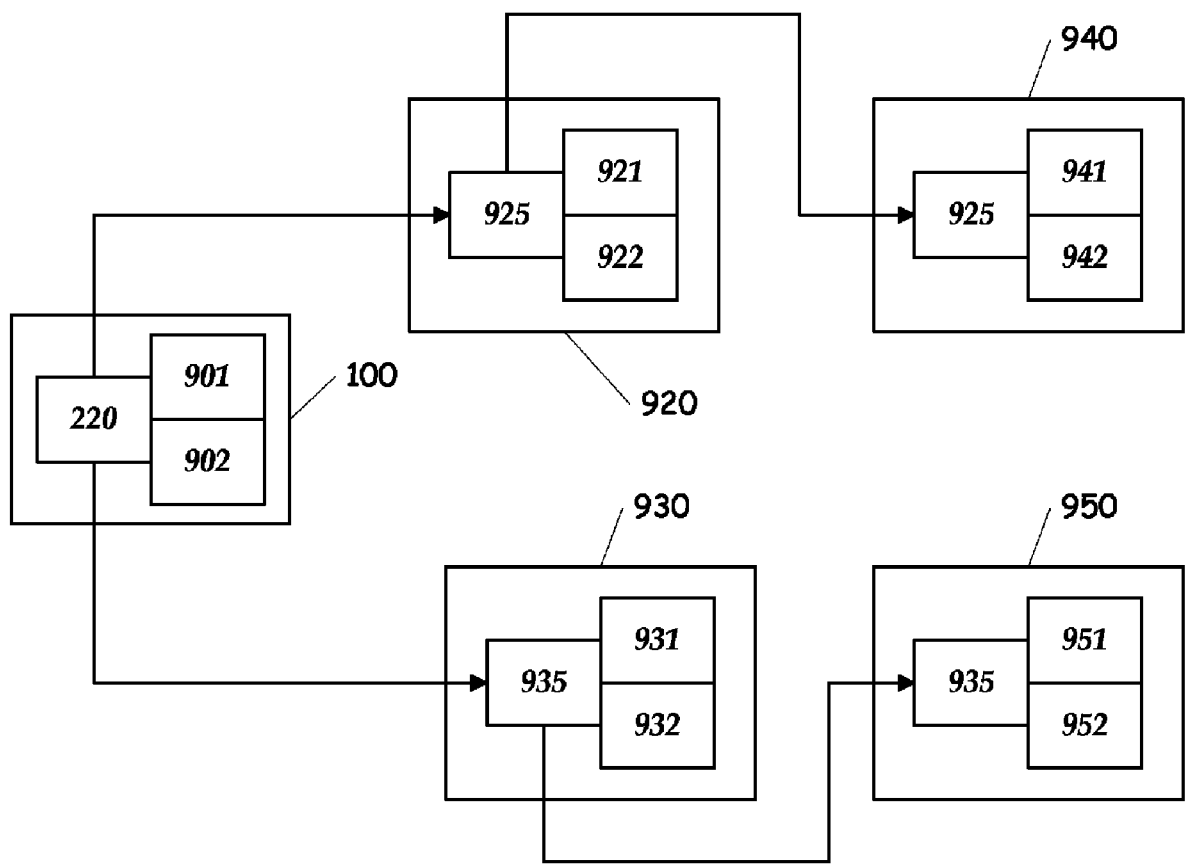
FIG. 11 is a block diagram illustrating the connection of a connectivity platform to other computing devices according to one embodiment

FIG. 8 is a flow diagram illustrating a process for assigning, managing and detecting addresses and conflicting addresses during the initial registration of a provider instance for a user. FIGS. 9 and 10 illustrate additional process for address conflict detection and management. FIG. 11 illustrates a simplified tree connection of devices through a provider. For purposes of convenience, FIGS. 8 to 11 will be discussed together.

The connectivity platform 120 uses functionality that is exposed from the protocol module 280 to generate a random address for the user or computing device associated with the provider instance 220. If the protocol module 280 does not have the functionality exposed or otherwise available, the connectivity platform 120 may generate the random address itself. In one embodiment the connectivity platform 120 (either through the protocol module or on its own) generates the address based on the requirements or considerations discussed with respect to FIG. 8. This is illustrated at step 810. Again for purposes of this discussion the scenario where only one provider instance 220 is present in the connectivity platform 120 is considered.

Referring now to FIG. 11, FIG. 11 is a block diagram illustrating the connection of a connectivity platform 120 on computing device 100 with providers on other computing devices 920 and 930 according to one illustrative embodiment. In the embodiment illustrated in FIG. 11, user 901 desires to connect to computing devices 920 and 930, and more specifically desires to connect to user 921 on computing device 920 and to user 931 on computing device 930. While the present discussion uses the word "user" with respect to the connections, those skilled in the art will readily understand that a user can be an application, program or other component of computing devices 100, 920 and 930 that requires end-to-end connectivity through a provider. Each user on computing devices 920 and 930 is assigned its own address 922, 932. These addresses are assigned to the respective users according to the protocols associated with the providers on those computing devices. Additionally, computing devices 920 and 930 are typically connected to other devices, such as devices 940 and 950. Similarly, each of these computing devices has their own users 941, 951 and addresses 942, 952. For purposes of simplicity only one user is illustrated connected to the computing devices 920 and 930. However, typically a plurality of users would be connected to each user on the computing devices 920, 930.

Once the address 902 has been generated for the user 901 at step 810 by the connectivity platform 120, the connectivity platform 120 requests that a conflicting address check is performed. This is illustrated at step 820. Step 820 includes steps 825, 827 and 829. While in FIG. 8 these steps are shown in a particular order it will be appreciated that in various embodiments the order of these steps may change or performed in parallel. The first part of this check is illustrated at step 825. At this step, the connectivity platform 120 checks all addresses on computing device 100 to ensure that there are not any conflicts. This process handles the possibility of multiple users and/or provider instances running simultaneously on computing device 100. If there is a conflicting address detected, the connectivity platform 120 generates a new random address for user 901 and repeats step 820.

In some embodiments, a counter may be maintained to limit the number of address resets and block the connection. This counter can stop a system from continuously resetting its addresses after a specific number of attempts. If a counter is present, at step 835 the value of the counter is checked, and if the number of address resets exceeds a threshold value connectivity using the protocol for which the address was generated, is blocked at step 840. In one embodiment, multiple counters may be present and each counter is associated with an individual conflict check step in the process 820. However, for purposes of this discussion only one counter is present. When a counter is present, it is assumed that the counter is large enough to ensure that all address conflicts on computing device 100 may be resolved before the generated address is assigned.

If there are no address conflicts detected at step 825 the process proceeds to step 827. At this step, the connectivity platform 120 checks the addresses of peers or other users that are reachable from provider instance 220 of computing device 100. For example, in order for user 901 to connect to user 921 or 931, their respective addresses cannot be the same as addresses on computing device 100. That is the address 902 cannot be the same as address 922 or 932. If the address is the same user 901 would not be able to connect to the desired user.

If there is a conflict detected between address 902 and either address 922 or 932 during step 827, the connectivity platform 120 generates a new random address for user 901, increments the counter (if present), and repeats steps 835 and 830. This is illustrated at step 830. If no conflict was detected at step 827 the connectivity platform 120 next determines if there is a conflict between addresses 942 and 952. In order for users 921 or 931 to connect to user 941 or 951, respectively, the respective address for users 941 and 951 cannot be the same as address 902 on computing device 100. If the addresses were the same, users 921 or 931 would not be able to differentiate user 901 from either user 941 or 951. This is illustrated at step 829. If a conflict was detected at step 829 the connectivity platform 120 may, in one embodiment, perform steps 835 and 830, resetting its address and checking if the new address conflicts. If a conflicting address is not detected, the address is assigned in step 845.

In one embodiment, step 827 and step 829 can be assisted by an address registry maintained as an Internet service. This address registry stores addressing information of participating users, computing devices, etc., and provides a simplified address checking mechanism. In other embodiments, a database maintained on computing device 100 may assist in the address checking process.

FIG. 9 is a flow diagram illustrating an address conflict check process that may occur when the user attempts to communicate after an address has been assigned. Following the successful address assignment, in FIG. 8, when user 901 desires to send data to one of its peers, the application sends data to the connectivity platform 120 at step 855. The connectivity platform 120 checks if there is an address conflict. This conflict may have either existed when address 902 was assigned or may have occurred after address 902 was assigned. This is illustrated at step 857. For example, at this step the connectivity platform 120 checks to see if only one peer is reachable by the desired application. If two destinations share the same address both would be reachable, and thus a conflict would be present. If there is an address conflict, connectivity platform 120 performs step 865. At this step, in some embodiments, the connectivity platform notifies the user of a transmission error. Further the connection to that peer is blocked at this step. However, if there is no existing conflict, the connectivity platform 120 transmits the data to the destination at step 860.

FIG. 10 is a flow diagram illustrating a process for handling an address conflict check that has been requested by a device that is connected to the computing device 120. Following the successful address assignment, in FIG. 8, at step 870 a request for an address conflict check is received at the connectivity platform 120. In some embodiments, in response to this request the connectivity platform 120 checks all addresses on computing device 100 to determine if there are any conflicting addresses on the computing device 100. This is illustrated at step 872. If no conflicts are detected on the computing device 100, the connectivity platform 120 checks all addresses on reachable peers. This is illustrated at step 875. If there are no conflicts detected, at step 880, connectivity platform 120 notifies the requesting peer that there are no conflicts. If a conflict is detected at either step 872 or 875, the connectivity platform 120 notifies the requesting peer of an address conflict at step 885.

Figure 12:
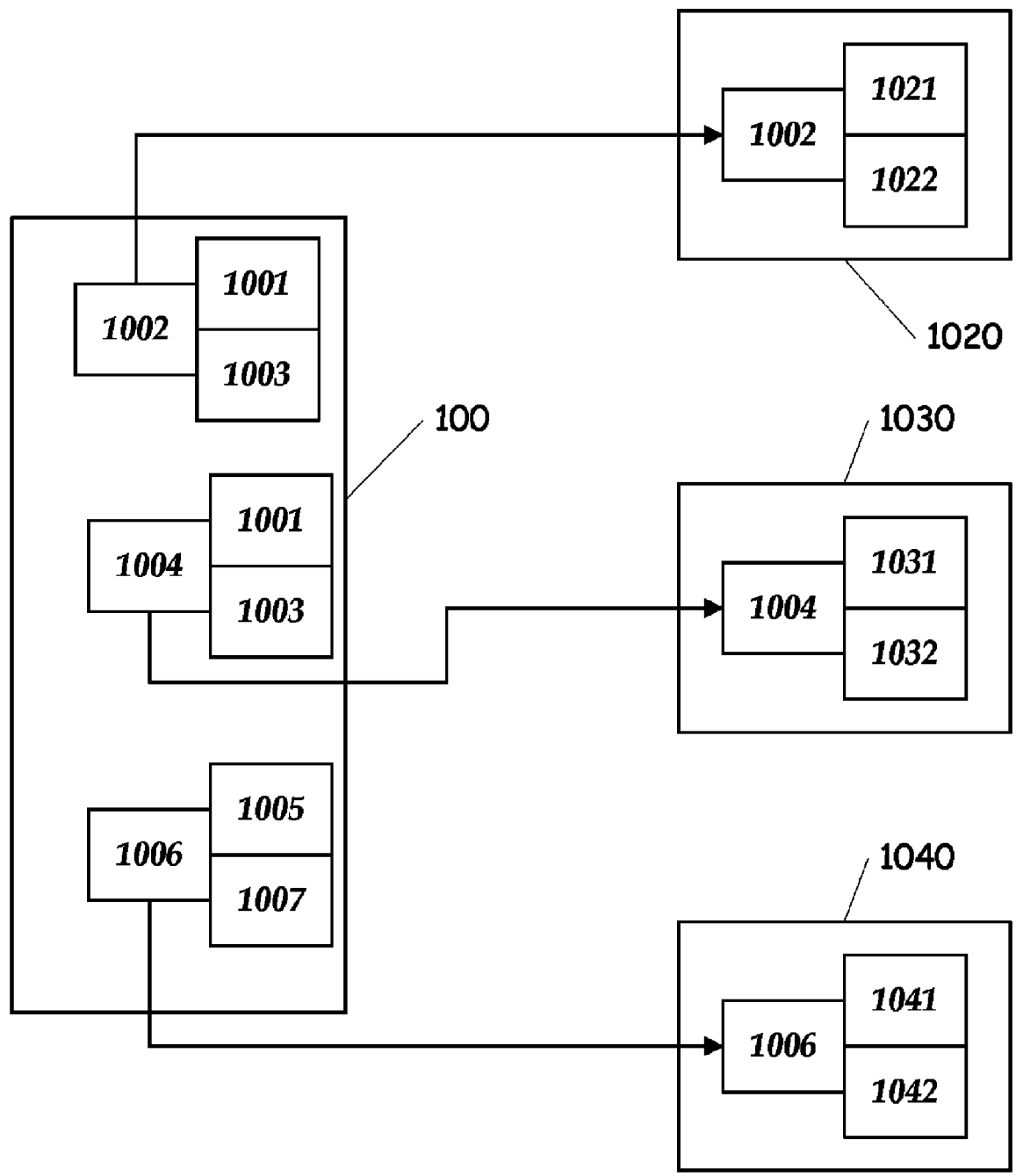
FIG. 12 is a block diagram illustrating the connection of multiple users on a connectivity platform according to one embodiment.

FIG. 12 is a block diagram illustrating the connection of a connectivity platform 120 on computing device 100 with providers on other computing devices 1020, 1030 and 1040 according to one illustrative embodiment. In contrast to the arrangement illustrated in FIG. 11 computing device 100 uses multiple providers 1002, 1004, and 1006. Further, computing device 100 also has multiple users 1001 and 1005. While FIG. 12 illustrates only two users and three providers, any number of users and providers may be present. In order to ensure that communications can flow between computing device 100 and its users 1001 and 1005 without being misdirected the connectivity platform 120 performs an internal address conflict check. Users 1001 and 1005 do not use the same provider (i.e. providers 1002, 1004 vs. 1006) however; to ensure that they can communicate with each other they must not share the same address. Further, if users 1001 and 1005 share a common address any service that has access to both users would be unable to identify the correct user. Thus, during the address conflict check the connectivity platform would check that address 1003 and address 1005 were not the same address. However, user 1001 may, in some embodiments, utilize the same address (1003) for both providers 1002 and 1004 as the connectivity platform 120 would direct any communication received at that address to user 1001.

Similarly, the connectivity platform 120 checks to ensure that the address 1022, 1032 and 1042 assigned to each of the other users 1021, 1031 and 1041 and providers 1002, 1004 and 1006 that are connected to computing device 100 do not conflict with one another. This is to ensure that all users are able to connect and communicate with each other without the possibility of conflicts despite connecting across different providers. The process for managing each of the address is performed in the same manner as discussed in FIG. 8 above.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A method, comprising:
   initiating through a first provider a connection from a first user on a connectivity platform to a second user, the first user associated with a first user address;

generating a new first user address for the first user responsive to determining that one or more addresses associated with the second user are the same as the first user address;

initiating through a second provider a connection from the first user to a third user, the second provider not the same as the first provider;

generating a second new first user address for the first user responsive to determining that one or more addresses associated with the third user are the same as the first user address; and denying connectivity between the first user and the second user and between the first user and the third user responsive to determining that one or more addresses associated with the third user are in conflict with one or more addresses associated with the second user.

2. The method of claim 1, comprising:

initiating through a third provider a connection from the first user to a fourth user; and generating a third new first user address for the first user responsive to determining that one or more addresses associated with the fourth user are the same as a user address of the first user.

3. The method of claim 2, the third provider not the same as the first provider.

4. The method of claim 1, the one or more addresses associated with the second user comprising addresses for users connected to the second user and an address of the second user, and the one or more addresses associated with the third user comprising addresses for users connected to the third user and an address of the third user.

5. The method of claim 1, the one or more addresses associated with the second user comprising at least one of at least one address for at least one user connected to the second user or at least one address of the second user, and the one or more addresses associated with the third user comprising at least one of at least one address for at least one user connected to the third user or at least one address of the third user.

6. The method of claim 1, comprising:

receiving a request for connectivity from a remote user through the first provider, the request including at least a remote user address; and denying connectivity between the first user and the remote user responsive to determining that the remote user address is in conflict with one or more addresses associated with the first user.

7. The method of claim 1, generating the new first user address comprising randomly generating the new first user address from a protocol module connected to the connectivity platform.

8. The method of claim 1, comprising:

identifying addresses of users connected to the second user; and comparing the identified addresses with a user address of the first user to determine whether one or more addresses associated with the second user are the same as the user address of the first user.

9. The method of claim 1, comprising:

generating a fourth user address for a fourth user; and generating a new fourth user address for the fourth user responsive to determining that the fourth user address is in conflict with a user address of the first user.

10. The method of claim 9, comprising generating a second new fourth user address for the fourth user responsive to determining that the fourth user address is in conflict with one or more user addresses associated with the first user.

11. A computer storage memory comprising instructions that when executed perform a method, comprising:

initiating through a first provider a connection from a first user on a connectivity platform to a second user, the first user associated with a first user address;

generating a new first user address for the first user responsive to determining that one or more addresses associated with the second user are the same as the first user address;

initiating through a second provider a connection from the first user to a third user, the second provider not the same as the first provider;

generating a second new first user address for the first user responsive to determining that one or more addresses associated with the third user are the same as a user address of the first user; and denying connectivity between the first user and at least one of the second user or the third user responsive to determining that one or more addresses associated with the third user are in conflict with one or more addresses associated with the second user.

12. The computer storage memory of claim 11, the one or more addresses associated with the second user comprising at least one of at least one address for at least one user connected to the second user or at least one address of the second user, and the one or more addresses associated with the third user comprising at least one of at least one address for at least one user connected to the third user or at least one address of the third user.

13. The computer storage memory of claim 11, the method comprising initiating through a third provider a connection from the first user to a fourth user, the third provider not the same as the first provider.

14. The computer storage memory of claim 11, the method comprising:

generating a fourth user address for a fourth user; and generating a new fourth user address for the fourth user responsive to determining that the fourth user address is in conflict with the user address of the first user.

15. A system comprising:

one or more processing units; and memory comprising instructions that when executed by at least some of the one or more processing units, perform a method, comprising:

initiating through a first provider a connection from a first user on a connectivity platform to a second user, the first user associated with a first user address;

generating a new first user address for the first user responsive to determining that one or more addresses associated with the second user are the same as the first user address;

initiating through a second provider a connection from the first user to a third user, the second provider not the same as the first provider;

generating a second new first user address for the first user responsive to determining that one or more addresses associated with the third user are the same as a user address of the first user; and denying connectivity between the first user and at least one of the second user or the third user responsive to determining that one or more addresses associated with the third user are in conflict with one or more addresses associated with the second user.

16. The system of claim 15, the one or more addresses associated with the second user comprising at least one of at least one address for at least one user connected to the second user or at least one address of the second user, and the one or more addresses associated with the third user comprising at least one of at least one address for at least one user connected to the third user or at least one address of the third user.

17. The system of claim 15, the method comprising:
receiving a request for connectivity from a remote user through the first provider, the request including at least a remote user address; and
denying connectivity between the first user and the remote user responsive to determining that the remote user address is in conflict with one or more addresses associated with the first user.

18. The system of claim 15, generating the new first user address comprising randomly generating the new first user address from a protocol module connected to the connectivity platform.

19. The system of claim 15, the method comprising:
identifying addresses of users connected to the second user; and
comparing the identified addresses with the user address of the first user to determine whether one or more addresses associated with the second user are the same as the user address of the first user.

20. The system of claim 15, the method comprising:
generating a fourth user address for a fourth user; and
generating a new fourth user address for the fourth user responsive to determining that the fourth user address is in conflict with the user address of the first user.

* * * * *